Oct. 30, 1923.
T. H. THOMAS
1,472,100
LOAD BRAKE DEVICE
Filed March 28, 1921 2 Sheets-Sheet 2
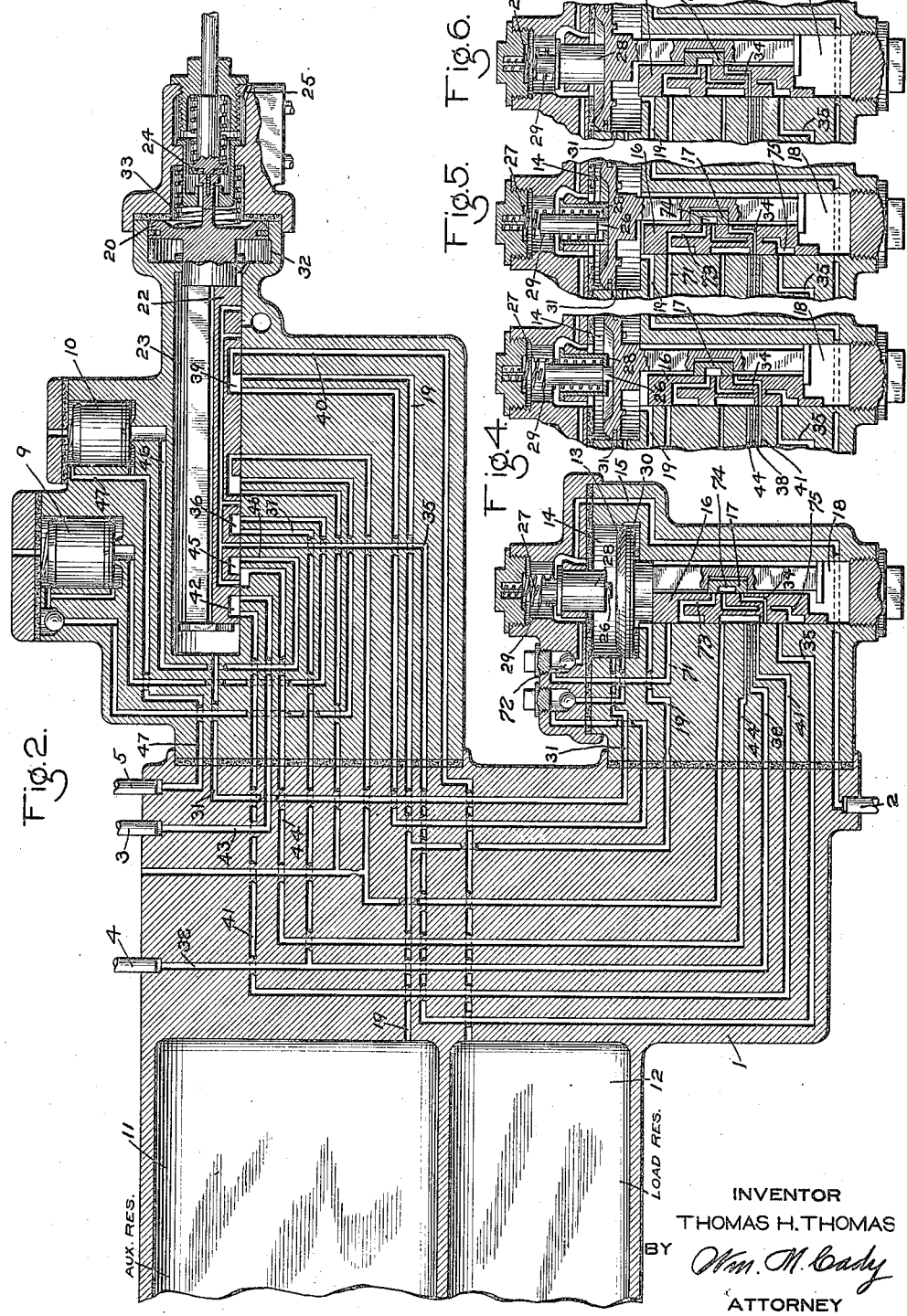
INVENTOR
THOMAS H. THOMAS
BY *Wm. M. Cady*
ATTORNEY Patented Oct. 30, 1923.

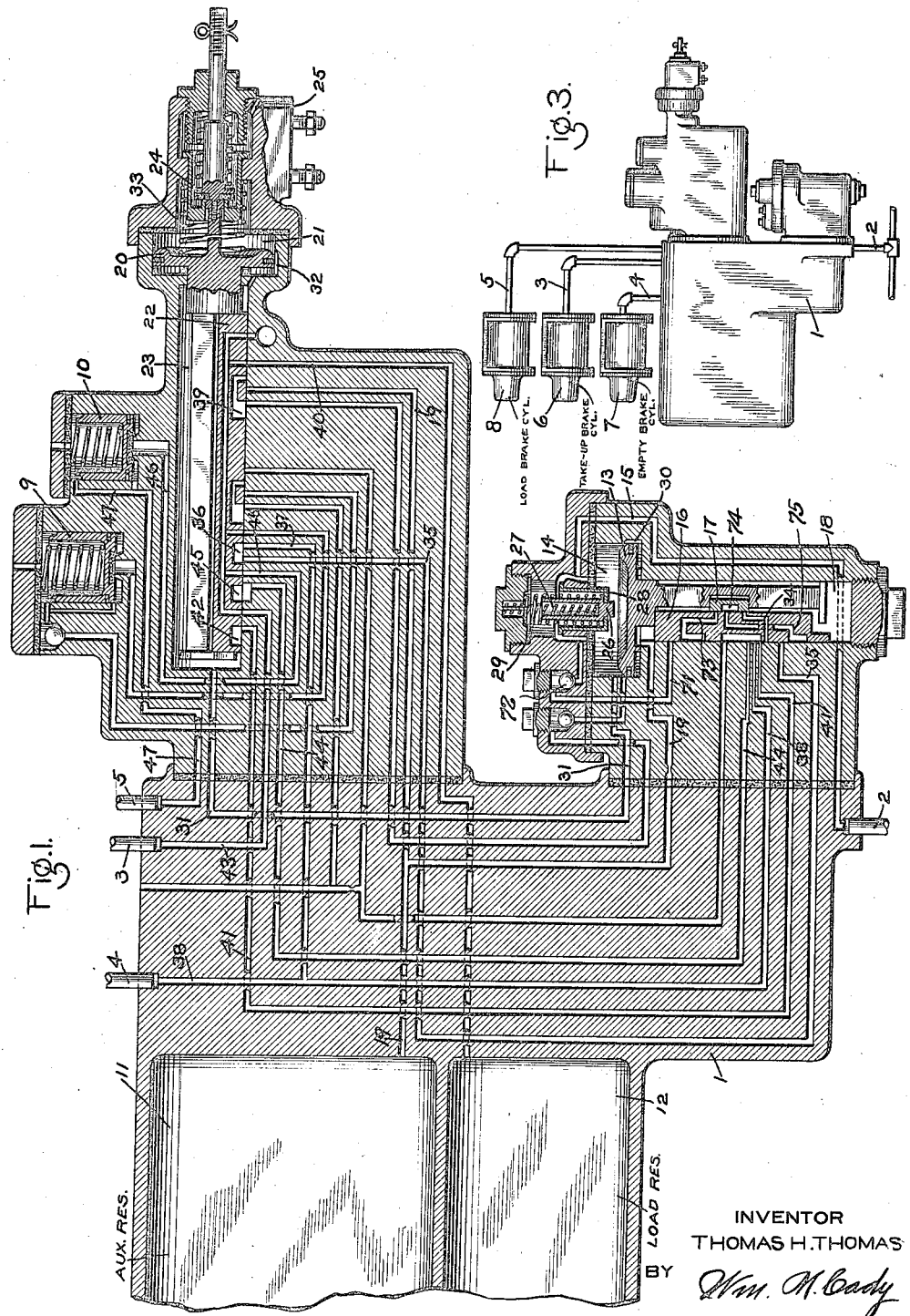

1,472,100

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LOAD-BRAKE DEVICE.

Application filed March 28, 1921. Serial No. 456,240.

*To all whom it may concern:*

Be it known that I, THOMAS H. THOMAS, a citizen of the United States, residing at Edgewood, in the county of Allegheny and State of Pennsylvania, have invented new and useful Improvements in Load-Brake Devices, of which the following is a specification.

This invention relates to fluid pressure brakes, and more particularly to an empty and load brake equipment.

The principal object of my invention is to improve the construction of the device shown in my prior Patent No. 1,390,593, dated September 13, 1921, and consists essentially in dispensing with the transfer valve devices of the prior patent and in accomplishing the same purposes by means of ports controlled by the triple valve device.

In the accompanying drawings; Fig. 1 is a diagrammatic central sectional view of an empty and load valve mechanism embodying my invention and showing the change-over valve device in the empty position; Fig. 2 a similar view, showing the change-over valve device in the load position; Fig. 3 a diagrammatic view of an empty and load car brake equipment, including the improved empty and load valve mechanism; and Figs. 4, 5, and 6, sectional views of the triple valve portion of the empty and load valve mechanism, showing the parts in the respective brake application positions for supplying fluid to the take-up brake cylinder, the empty car brake cylinder, and the load brake cylinder.

As shown in Fig. 3 of the drawings, the car brake equipment may comprise an empty and load valve mechanism 1, connected to the brake pipe 2, and by pipes 3, 4, and 5 respectively, to the take-up brake cylinder 6, the empty brake cylinder 7, and the load brake cylinder 8.

The empty and load valve mechanism 1 may include a change-over valve device, a triple valve device, valve pistons 9 and 10, an auxiliary reservoir 11, and a load reservoir 12.

The triple valve device may comprise a piston 13, contained in a piston chamber 14, connected by a passage 15 with the brake pipe 2, and a main slide valve 16 and a graduating slide valve 17, contained in a valve chamber 18, connected by a passage 19 with the auxiliary reservoir 11.

The change-over valve device may comprise a piston 20, contained in piston chamber 21 and a slide valve 22, contained in valve chamber 23, and adapted to be operated by piston 20.

For controlling the operation of piston 20, a manually operated valve 24 is provided which is adapted to be moved to a position for venting fluid from the piston chamber 21 to an atmospheric exhaust port 25.

In the triple valve device, a spring stop 26, acted upon by a spring 27, defines the position of piston 13 for supplying fluid to the take-up brake cylinder 6, and a spring stop 28, acted upon by a spring 29, defines the position of piston 13 for supplying fluid to the empty brake cylinder 7, while the full movement of the triple valve piston 13 is required to establish communication for supplying fluid to the load brake cylinder 8.

In operation, the triple valve piston chamber 14 is charged from the brake pipe 2 through passage 15 and fluid flows from said piston chamber through the usual feed grooves 30, to valve chamber 18 and thence through passage 19 to the auxiliary reservoir 11.

The valve chamber 23 of the change-over valve device is also charged with fluid under pressure from the piston chamber 14, through a passage 31.

If the valve 24 is manually moved to the empty position, as shown in Fig. 1, said valve being seated, fluid equalizes from valve chamber 23 through feed groove 32 into piston chamber 21, permitting the spring 33 to maintain the piston 20 in its empty position.

With the change-over valve device in the empty position, if the brake pipe pressure is reduced to effect an application of the brakes, the triple valve piston 13 moves the slide valve 16 so as to connect port 34 with passage 38 and since the graduating valve 17 has moved to uncover the port 34, fluid will be supplied from the auxiliary reservoir 11 to the empty brake cylinder 7, and in addition, as with the construction disclosed in my prior Patent No. 1,390,593, a quick service venting of fluid from the brake pipe to the empty brake cylinder takes place through the passage 71, past check valve 72, port 73 and slide valve 16, cavity 74 in graduating valve 17, ports 75 and through passage 35, cavity 36 in the change-over slide valve 22 and passages 37 and 38 to the empty brake cylinder pipe 4.

The change-over valve device is set to load position by manually moving the valve 24 so as to connect the piston chamber 21 with exhaust port 25, the pressure in the valve chamber 23 then shifting the parts to the load position, as shown in Fig. 2 of the drawings. In this position, the load reservoir 12 is connected to the auxiliary reservoir 11 through passage 19, cavity 39 in the change-over slide valve 22 and passage 40, so that the load reservoir is charged with fluid under pressure.

When the brake pipe pressure is reduced to effect an application of the brakes, the triple valve piston 13 is first moved out to a position in which the piston engages the spring stop 26, as shown in Fig. 4. In this position, the port 34, in the main slide valve 16, registers with a passage 41 and fluid is then supplied from the auxiliary reservoir and the load reservoir 12 to the take-up brake cylinder 6 through passage 41, cavity 42 in change-over valve 22 and passage 43.

Fluid flows to the take-up brake cylinder 6 until the brake pipe pressure has been reduced to a degree such that the auxiliary reservoir pressure, acting on the valve chamber side of the piston 13, will overcome the pressure of the spring 27 plus the reduced brake pipe pressure and then the piston will move out so as to engage the spring stop 28. In this position, as shown in Fig. 5 of the drawings, the port 34 registers with passage 38, so that fluid is now supplied from the reservoirs to the empty brake cylinder 7.

When the brake pipe pressure has been still further reduced, so that the reservoir pressure acting in valve chamber 18 on the piston 13 exceeds the pressure of the spring 29 plus the reduced brake pipe pressure, the piston will move out to its seat, as shown in Fig. 6 of the drawing.

In this position, the port 34 registers with a passage 44, so that fluid under pressure is now supplied to the load brake cylinder 8 through passage 44, cavity 45 in change-over slide valve 22, passage 46, past the valve piston 10 to passage 47, and thence to the load brake cylinder pipe 5.

It will now be seen that by the movement of the triple valve parts, fluid under pressure in applying the brakes is successively supplied to the take-up brake cylinder 6, the empty brake cylinder 7 and finally the load brake cylinder 8.

Having now described my invention, what I claim as new and desire to secure by Letters Patent, is:—

1. In a load brake, the combination with a plurality of brake cylinders, of a triple valve device having a position for supplying fluid under pressure to one brake cylinder and another position for supplying fluid under pressure to another brake cylinder.

2. In a load brake, the combination with a plurality of brake cylinders, of a brake pipe and a triple valve device operated upon a reduction in brake pipe pressure for supplying fluid to one brake cylinder, and upon a further reduction in brake pipe pressure for supplying fluid to another brake cylinder.

3. In a load brake, the combination with a plurality of brake cylinders, of a brake pipe and a triple valve device operated as the brake pipe pressure is reduced for successively supplying fluid under pressure to said brake cylinders.

4. In a load brake, the combination with a take-up brake cylinder, an empty brake cylinder, and a load brake cylinder, of a brake pipe and a triple valve device operated upon a reduction in brake pipe pressure for supplying fluid under pressure to the take-up brake cylinder, upon a further reduction in brake pipe pressure to the empty brake cylinder, and upon a still further reduction in brake pipe pressure to the load brake cylinder.

5. In a load brake, the combination with a plurality of brake cylinders, of a brake pipe a triple valve device movable upon a reduction in brake pipe pressure to a position for supplying fluid under pressure to one brake cylinder and movable to another position upon a further reduction in brake pipe pressure for supplying fluid to another brake cylinder, and spring stops acting on said triple valve device for defining said positions.

6. In a load brake, the combination with a plurality of brake cylinders, of a brake pipe, a triple valve device having a piston and valve means movable upon a reduction in brake pipe pressure to a position for supplying fluid under pressure to one brake cylinder and movable to another position for supplying fluid to another brake cylinder upon a further reduction in brake pipe pressure, and yielding means acting on said piston for defining said positions.

7. In a load brake, the combination with two brake cylinders, of a brake pipe and a triple valve device operated upon a reduction in brake pipe pressure for supplying fluid under pressure to one brake cylinder and operated upon a further reduction in brake pipe pressure for supplying fluid to the other brake cylinder and for cutting off communication through which fluid is supplied to the first brake cylinder.

8. In a load brake, the combination with a take-up brake cylinder, an empty brake cylinder, and a load brake cylinder, of a brake pipe, and a triple valve device movable upon a reduction in brake pipe pressure to a position for supplying fluid under pressure to the take-up brake cylinder, and movable upon a further reduction in brake pipe pressure to a position for supplying fluid to the empty brake cylinder and for cutting off communication through which fluid is supplied to the take-up brake cylinder, and movable upon a further reduction in brake pipe pressure to a position for supplying fluid to the load brake cylinder and in which position communication for supplying fluid to the other brake cylinders is cut off.

9. In a load brake, the combination with a brake pipe and a plurality of brake cylinders, of a valve device operative according to the reduction in brake pipe pressure for successively supplying fluid under pressure to said brake cylinders.

In testimony whereof I have hereunto set my hand.

THOMAS H. THOMAS.